Nov. 13, 1962 J. W. FORREST 3,063,264
CONSTANT VELOCITY RATIO COUPLING
Filed Feb. 28, 1961

INVENTOR.
JOHN W. FORREST
BY
ATTORNEYS

United States Patent Office 3,063,264
Patented Nov. 13, 1962

3,063,264
CONSTANT VELOCITY RATIO COUPLING
John W. Forrest, West Acton, Mass., assignor to Acton Laboratories, Inc., a corporation of Massachusetts
Filed Feb. 28, 1961, Ser. No. 92,390
3 Claims. (Cl. 64—31)

This invention relates to a flexible shaft coupling and more particularly to a coupling which will transmit motion with a velocity ratio of unity.

Heretofore various types of flexible shaft couplings have been devised, but few of these have been designed or were adaptable for use in precision instruments, as, for example, in instruments having servo drives and electromechanical transducers. Attempts to miniaturize conventional relatively large size couplings have not been fully satisfactory for various reasons, including lack of precision, excessive backlash, failure to accommodate both angular and lateral misalignment between coupled shafts, excesisve cost, and failure to prevent axial movement of coupled shafts toward each other.

Accordingly, it is the primary object of this invention to provide a flexible shaft coupling which will transmit angular motion between two misaligned shafts with the torsional rigidity and accuracy of a single shaft.

Another object of the present invention is to provide a backlash-free flexible coupling for two shafts which not only will transmit motion with a velocity ratio of unity but will transmit angular motion in either direction of rotation while simultaneously accommodating both angular and lateral misalignment between the coupled shafts.

A further object of the present invention is to provide a flexible shaft coupling which is compact, light weight, and economical to manufacture, and which also is easy to assemble and disassemble. This coupling essentially comprises two hub units which are separated by a floating insert member which cooperates with the hub units to couple them together while at the same time accommodating angular misalignments of the shafts to which the hub units are secured.

Other objects and many of the features and attendant advantages of the present invention will become more readily apparent as reference is had to the following detailed specification when considered together with the accompanying drawings wherein.

Figure 1:
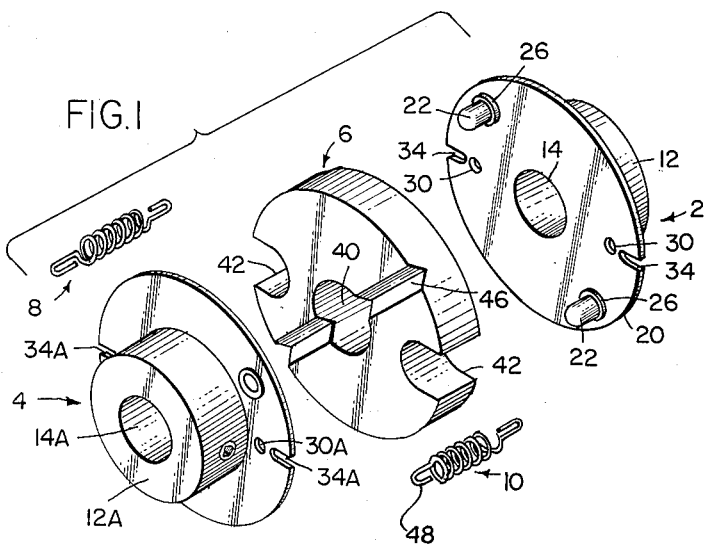
FIG. 1 is an exploded perspective view of a flexible shaft coupling embodying the present invention.
Figure 3:
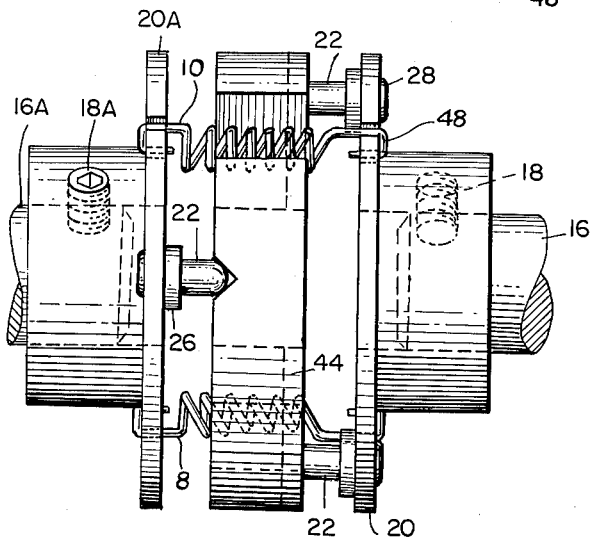
FIG. 3 is a side elevation of the flexible shaft coupling comprising the components of FIG. 1.

Referring first to FIGURES 1 and 3, a flexible shaft coupling embodying the present invention comprises five elements. These are identical hubs 2 and 4, a floating insert member 6, and two springs 8 and 10 which couple together the two hub units and the insert member.

Figure 4:
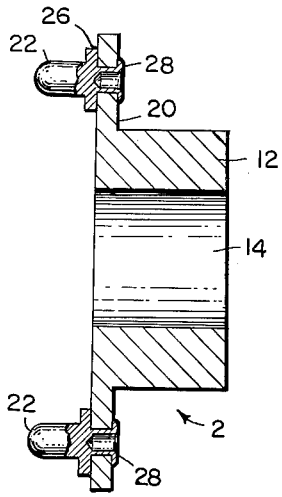
FIG. 4 is a longitudinal sectional view through the center of one of the hub members illustrated in FIGS. 1 and 3.
Figure 2:
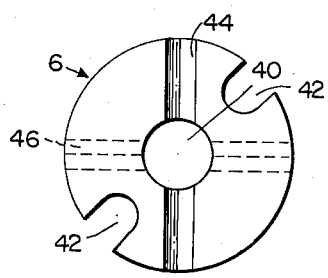
FIG. 2 is an end view of the floating insert member which forms part of the present invention.

The hub unit 2 comprises a cylindrical hub member 12 having a central bore 14 which is sized to accommodate a shaft 16 (FIG. 3). Hub member 12 is provided with a radial bore which is tapped to accommodate a socket-type set screw 18 which functions to clamp it to shaft 16. The hub member has an integral peripheral flange 20 at one end. Flange 20 is provided with two diametrically opposed holes in which identical ball pivots 22 are secured. The ball pivots 22 are fashioned from pins which are rounded at one end and which are hollowed at the other end. These pins also have flanges 26. The hollow portions of the pins are inserted in the holes formed in the flange 20 and the hollow ends are then swaged or peened over as shown at 28 in FIG. 4 so as to force the pin flanges 26 tight against the hub flange 20. As a result, the ball pivots are incapable of movement relative to hub member 12. Flange 20 is also provided with two diametrically opposed holes 30 and two diametrically opposed slots 34 which are in radial alignment with holes 30. Holes 30 and slots 34 are displaced angularly from the ball pivots 22.

The second hub unit 4 is identical to hub unit 2. Accordingly, like parts are identified by like numerals followed by the letter A.

The floating insert 6 is formed of a substantially incompressible material which is at the same time tough. Preferably, the insert is constructed of a plastic material such as tetrafluoroethylene plastic, nylon, or Delrin. Alternatively, it may be made of a metal such as stainless steel. The floating insert 6 is generally of circular configuration, and preferably, but not necessarily, it is provided with a center hole 40. The edge of the floating insert 6 is provided with diametrically opposed notches 42 which are substantially larger in size than the slots 34 of hub units 2 and 4. The floating insert 6 is also formed with a V-groove 44 on one side and a V-groove 46 on the other side, with the two V-grooves displaced 90 degrees with each other.

The two springs 8 and 10 are coiled tension springs whose opposite ends are hooked as shown at 48.

The two hub units are oriented so that the ball pivots 22 of hub unit 2 are situated in V-groove 44 and the ball pivots 22A of hub unit 4 are situated in V-groove 46. When the units are so oriented, the holes 30 and 30A and the slots 34 and 34A will be in registration with the large notches 42 of the floating insert member 6. As a consequence, the spring elements 8 and 10 may be positioned within the slots 42 and their ends hooked into the holes 30 and 30A of the hub members. The thickness of insert member 6 and the lengths of the two identical springs 8 and 10 and the pins 22 and 22A is such that the springs are stretched when they are connected to the two hub elements with the ball pivots disposed in the two V-grooves 44 and 46. As a consequence, the ball pivots are held in the V-grooves due to the loading of the springs. This eliminates all backlash. At the same time, the ball pivots can slide laterally along their V-grooves with a minimum amount of friction. This allows the coupling to compensate for lateral misalignment of the two shafts to which they are connected. The ball pivots also allow the hubs to pivot relative to each other, thereby accommodating for angular misalignment of the coupled shafts. The actual transmission of power is accomplished by the ball pivots acting through the floating insert member 6. Thus, for example, if shaft 16 is the driving shaft and shaft 16A is the driven shaft, rotation of shaft 16 will cause hub unit 2 to rotate. The latter in turn will cause the floating member 6 to rotate with it, power being transmitted from hub unit 2 to the floating member 6 through its pins or ball pivots 22. The floating member in turn transmits power to the output hub unit 4 by way of the cooperative engagement of the ball pivots 22A with the V-groove 46 of the floating insert member.

The foregoing construction has many advantages, chief of which is the fact that it will transmit motion with a velocity ratio of unity and without backlash. At the same time, it will accommodate both angular and lateral misalignment between coupled shafts. A further advantage is that it is relatively small, compact, and light weight. Still a further advantage is that the floating insert may be made of various metal or plastic materials.

Other advantages are ease of assembly and disassembly, and small number of parts.

It is recognized, of course, that the foregoing construction is capable of variation. Thus, for example, the pins 22 may be formed integral with the hub units. Similarly, the flanges 20 and 20A need not be formed integral with the hub units but may be separate pieces which are secured to the hubs.

Obviously, many other modifications and variations of the present invention also are possible in view of the foregoing teachings. It is to be understood, therefore, that the invention is not limited in its application to the details of construction and arrangement of parts specifically described or illustrated, and that within the scope of the appended claims it may be practiced otherwise than as specifically described or illustrated.

I claim:

1. A flexible shaft coupling for transmitting angular motion of unity ratio between coupled shafts comprising first and second hub units each having a pair of diametrically opposed ball pivot elements attached thereto, the ball pivot elements on one hub unit displaced 90 degrees from the ball pivot elements of the other hub unit, a floating insert member of substantially incompressible material positioned between the two hub units, said floating insert member having V-shaped grooves cooperating with the ball pivot elements on said hub units for transmitting motion free of backlash from one to the other of said hub units notwithstanding lateral or angular misalignment of said hub units, and a pair of tension springs connected to and urging together said two hub units whereby to retain said ball pivot elements in cooperating relation with the grooves in said floating insert member.

2. A flexible coupling as defined by claim 1 wherein each spring is connected at one end to one hub unit and at the other end to the other hub unit.

3. A flexible coupling as defined by claim 2 wherein said insert member has a pair of slots and further wherein said springs are disposed within said slots.

References Cited in the file of this patent

UNITED STATES PATENTS

| | | |
|---|---|---|
| 2,365,128 | Wahl | Dec. 12, 1944 |
| 2,551,735 | Goff | May 8, 1951 |
| 2,599,329 | Huntington | June 3, 1952 |